United States Patent [19]

Salick

[11] 4,026,244
[45] May 31, 1977

[54] BIRD FEEDER

[76] Inventor: Ralph A. Salick, 6948 N. Wildwood Pt., Hartland, Wis. 53209

[22] Filed: June 2, 1975

[21] Appl. No.: 583,197

[52] U.S. Cl. .............................. 119/51 R; 119/26; 206/223

[51] Int. Cl.² ........................................ A01K 39/01

[58] Field of Search .......... 119/51 R, 52 R, 22–26; D30/14; 426/91, 132; 206/223, 804, 383

[56] References Cited

UNITED STATES PATENTS

| | | | |
|---|---|---|---|
| 1,618,324 | 2/1927 | Burt | 426/91 |
| 1,895,697 | 1/1933 | York | 426/91 |
| 3,179,244 | 4/1965 | Kuhn | 119/52 R |
| 3,568,641 | 3/1971 | Kilham | 119/51 R |

*Primary Examiner*—Louis G. Mancene
*Assistant Examiner*—Peter K. Skiff
*Attorney, Agent, or Firm*—Elroy J. Wutschel

[57] ABSTRACT

The bird feeder is unique and yet extremely practical. It is comprised of a length of pliable plastic tubing permanently sealed at one end and open at the other end to provide a cylindrical container for receiving and retaining bird seed. After the seed has been placed in the container the throat or top end is closed by means of a length of nylon cord, wire, tape or the like. The other end of the cord is used to suspend the bird feeder from a tree branch or other securement protrusion. A perch bar or bars are provided for said container. One end of each bar or stick is pointed. The pointed end is used to pierce opposite sidewalls of the plastic container and permit installation in any desired horizontal position with opposite ends protruding to provide two perch stations upon which birds may alight. Depending on the size of bird which is to be attracted to the feeder, a second hole is pierced a desired distance above the perch station to enable a bird to extract a seed at a time for consumption. Because the feeding hole was pierced, no other seed will spill from the container nor will the seeds be affected during inclement weather.

3 Claims, 4 Drawing Figures

U.S. Patent    May 31, 1977    4,026,244
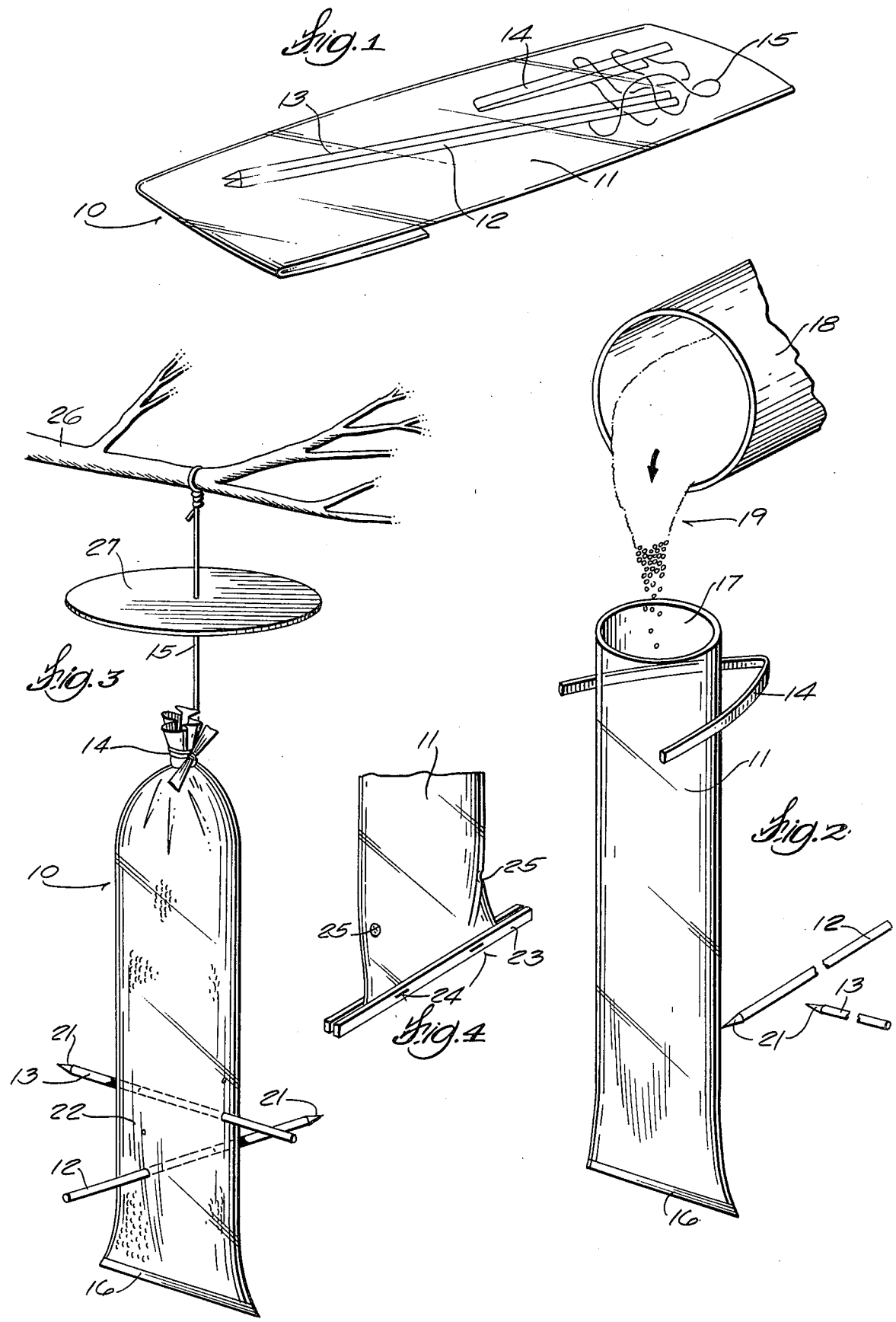

BIRD FEEDER

BACKGROUND OF INVENTION

The subject invention relates to a unique bird feeder which is structurally non-rigid, readily manufactured and retained in an erectile condition subject to the addition of feed for use as a bird feeder.

Bird feeders per se in various types and shapes have been available for years. In fact, ever since humans elected to feed their feathered friends. All of these were rigid structures which required a considerable amount of time to construct and maintain.

SUMMARY OF INVENTION

One object of the invention is to provide an improved bird feeder.

Another object of the invention is to provide a non-rigid feeder.

Another object is to construct a feeder having a pliable body serving to receive and retain bird feed for continuous accessibility by birds in wild life.

A still further object of the invention is to provide a bird feeder having a minimum number of components which can be readily assembled by the entrepreneur or user at the time feed is introduced into the body of the feeder and thereafter refilled as the bird feed is depleted.

Another object is to provide a feeder having a non-obscure body whereby the feed therein can be seen by birds from any direction while the custodian of the feeder can readily observe the level of the feed remaining in the feeder.

Yet another object of the invention is to provide a feeder having a pliable body in which a feed opening can be selectively located and a perch bar for a bird can be selectively installed relative to the feed opening in the body while the length of the bar is trimmed so that the protruding ends of the bar serve to determine the size of birds which can perch thereon while feeding from the body opening.

Other objects of the invention will become apparent from the following description of the preferred embodiment of the invention together with the accompanying drawing.

BRIEF DESCRIPTION OF THE DRAWING

FIG. 1 is a perspective view of the feeder body, perch sticks, and cord unassembled and ready for packaging.

FIG. 2 is a perspective view of the pliable feeder body retained in a vertical position while the container is opened to receive bird food preparatory to suspending the feeder for use; two pointed perch bars are in a preparative position immediately prior to being installed in the body.

FIG. 3 is a perspective view of the feeder suspended from a tree limb and ready for use as a bird feeder.

FIG. 4 is a modified version of the feeder with the perch bar permanently secured to the bottom of the body.

DETAILED DESCRIPTION OF THE INVENTION

Numerous bird feeders have been built commercially and by amateurs to supply the needs of those who wish to feed wild birds on or about their premises. All are of the rigid type and thus are bulky to ship and store. While the rigid type of feeder generally includes a transparent panel so that birds and the user can readily view the feed contained therein, the view is generally restricted. In providing a greatly simplified feeder, the inventor has utilized a transparent tubular and non-rigid body sealed at one end to contain bird seed. Thus, the feeder can be easily seen from any direction by wild birds living in the immediate surroundings and by the user to determine the amount of feed remaining therein. Two perch bars selectively positioned in the body serve to provide four perches horizontally disposed so birds can alight and extract seeds through a feed opening in the body. The distance vertically between the feed opening and the perch determines the size of bird which can readily feed from the feeder.

As shown in FIG. 1, a bird feeder 10 is comprised of a tubular transparent body 11, a pair of perch bars or sticks 12 and 13, a binder strip 14 and a length of cord 15. The body 11 is permanently sealed at the lower end 16 and open at the opposite end 17 to provide a receptacle for receiving bird feed, such as various types of seed, prepared granular feeds and the like.

The feeder components can be individually packaged and marketed in an unassembled state, as shown in FIG. 1, or filled, assembled and packaged ready to be marketed as a ready-to-use bird feeder complete with feed.

In either case, the open end 17 of the body or tubing 11 is placed under a feed discharge chute 18 in a manner that the bird feed 19 can be fed into the body or container, as shown in FIG. 2. After a predetermined amount of feed is contained the open end 17 is closed by means of a weatherproof twist tape, nylon cord, or wire 14.

The perch bars or rods 12 and 13 are each provided with points 21 which are used to pierce the sidewall of the body 11. Initially, the sharpened point 21 is used to pierce the transparent wall and provide a pair of feed openings 22 diametrically opposite one another. Both openings are best made by piercing the side wall material from the outer face inwardly in order to insure that the excess material around the opening is forced inwardly and provide a retaining edge to prevent seeds from being forced outwardly through the opening. The size of the feed opening will approximate the size of the rod; the openings may need to be enlarged if larger seeds are placed in the container. Normally, the openings remain partially closed and thus protect the feed during inclement weather.

The owner of the bird feeder would need to initially decide the size of birds which are to be attracted to the feeder. For example, if small species of birds such as nuthatches, finches and chickadees are to be attracted, the perch bars 12 and 13 would be reduced in overall length to provide a one inch perch from the sidewall of the container body 11. If medium sized species of birds are to be attracted, the proper perch length would be approximately two and a half inches. Robins, bluebirds and other larger species would require a still longer perch. By tailoring the length of the perch bar to accommodate a particular size species, all species of larger sized birds will be unable to alight on the shortened perch. The location and punching of the feeder openings and the installation of the perches can be accomplished either before or after the body 11 is filled with bird feed.

Likewise, the size of the species of birds to be fed would dictate the distal placement of the perch sticks 12 and 13 beneath the feed openings 22. For the convenience of the small species, the perch bars should be located about one inch beneath the opening. Intermediate sized species would require more room between the perch and the feed opening, in the rang of two to three inches, while larger species would require further spacing. Since the perch bars are selectively positioned, the position can be readily changed to provide more or less space. As the perch bars are withdrawn, the remaining holes in the plastic sidewalls will close and prevent seeds from escaping.

As shown in FIG. 3, the feed openings 22 and the perch bars 12 and 13 are best located in the lower half of the container body 11, so that the feed above the opening 22 can be extracted a seed at a time by birds. At least one set of openings and perch bar had best be located near the bottom of the body in order to insure that most of the feed is consumed before a refill is necessary.

A modified version of the bird feeder 10 is shown in FIG. 4 in which a single perch bar 23 is utilized. During assembly the bottom end of the pliable body 11 is wrapped around the mid-section of the bar 23 and is secured thereto by means of a moisture proof mastic or by stapling the two together. Two staples 24 were used as a securement in the illustrative drawing. The overall length of the bar would determine the length of the two protruding perches which in turn, will dictate the size of bird capable of using the feeder. Holes 25 punched a predetermined distance above each perch 23 provide a convenient food extraction opening for the birds using the feeder. This embodiment of the invention provides the same features and advantages previously ascribed to the primary version of the bird feeder.

The installation of the bird feeder is rather simple and can be readily accomplished. One end of the cord 15 is securely tied to the open end of the body 11 directly adjacent to the twist binder strip 14. The top end of the cord is tied to a branch of a tree 26, or other extending protrusion from a post or the like in a position to securely support the bird feeder 10. If it is possible that squirrels or other animals may attempt to reach the feeder, a baffle 27 may be selectively positioned on the cord 15. The baffle will serve to prevent any animals from either climbing down the cord or from jumping on to the feeder from an adjoining branch or the like. The cord is preferably made from nylon or other synthetic material having sufficient strength to not only support the feeder during all types of weather, but also to support any unusual load placed thereon in the event that an animal attempts to reach the feeder.

Thus a new and novel bird feeder is provided. It should be apparent to one skilled in the art that the pliable container need not necessarily have a tubular configuration, rather it could have any standard or uniform configuration which is manufactured and readily available. Further, the length of the container body 10 could be readily increased or decreased, depending upon the type of feed which is to be placed therein. Obviously, if a fine grained seed such as thistle seed is to be placed therein a much shorter container body could be utilized.

The bird feeder herein described and shown is intended to be representative only and certain variations are readily discernable to one skilled in the art without departing from the spirit and scope of the invention.

What is claimed is:
1. A bird feeder comprising
   a. a body having a pliable configuration to contain feed
   b. one or more feed openings on the periphery of said body
   c. a perch bar extending traversely from the body in the proximity of each feed opening to permit a bird to extract feed particles while feeding therefrom, with
   d. the body sealed at one end to provide a cavity for feed,
   e. a closure means operative after filling with feed to close the body and fully contain the feed therein,
   f. a pointed perch bar to peripherally penetrate the body in approximate diametral relationship to create feed openings, with
   g. the pointed bar further adapted to penetrate the body material in a diametral relationship beneath each of the feed openings, and with
   h. the pointed perch bar of a length to extend through the body and from opposite sides thereof to provide a perch upon which a bird may alight and extract feed from a feed opening above the perch.
2. A bird feeder comprising a method of utilizing
   a. a length of pliable and transparent tubing with one end thereof sealed to provide a bird feed receiving cavity,
   b. a closure means to close the opposite end of said tubing and permit suspension of the feed filled tubing,
   c. a pointed perch bar to penetrate the tubing wall selectively and create a feed opening, and with
   d. the pointed bar further serving as a bird perch when the bar is inserted transversely of the tubing is selective spaced relationship to the feed opening.
3. A bird feeder comprising
   a. a body having a pliable configuration for bird feed retention,
   b. a perch bar secured at one end of the tubular body to close the end thereof and provide a container to receive and store feed against spoilage,
   c. a restricted feed opening a preselected distance above the bar to enable a bird to extract feed through the opening without spillage, and
   d. a pointed perch bar to penetrate the body diametrally to selectively provide oppositely disposed feed openings on said body, with
   e. the pointed perch bar again utilized to penetrate and extend through the body and provide protruding perches beneath each of the feed openings for bird feeding therefrom.

* * * * *